(12) United States Patent
Thakkar et al.

(10) Patent No.: US 11,320,336 B2
(45) Date of Patent: May 3, 2022

(54) GAS SHUTOFF SYSTEM

(71) Applicants: Pavan Vipul Thakkar, Charlotte, NC (US); Brook Ephrem, Charlotte, NC (US)

(72) Inventors: Pavan Vipul Thakkar, Charlotte, NC (US); Brook Ephrem, Charlotte, NC (US)

( * ) Notice: Subject to any disclaimer, the term of this patent is extended or adjusted under 35 U.S.C. 154(b) by 0 days.

(21) Appl. No.: 17/234,342

(22) Filed: Apr. 19, 2021

(65) Prior Publication Data

US 2021/0396359 A1 Dec. 23, 2021

Related U.S. Application Data

(60) Provisional application No. 62/705,336, filed on Jun. 22, 2020.

(51) Int. Cl.
*G01F 15/00* (2006.01)
*F16K 17/20* (2006.01)
*F16K 17/34* (2006.01)
*G01M 3/28* (2006.01)

(52) U.S. Cl.
CPC ......... *G01M 3/2807* (2013.01); *F16K 17/205* (2013.01); *F16K 17/34* (2013.01); *G01F 15/002* (2013.01); *G01F 15/005* (2013.01)

(58) Field of Classification Search
CPC .... G01F 15/005; G01F 15/002; G01F 15/063; F16K 17/205; F16K 17/34
See application file for complete search history.

(56) References Cited

U.S. PATENT DOCUMENTS

| | | | |
|---|---|---|---|
| 2010/0307600 A1* | 12/2010 | Crucs | E03B 7/071 137/2 |
| 2013/0248023 A1* | 9/2013 | Estrada, Jr. | E03B 7/071 137/551 |
| 2014/0231531 A1* | 8/2014 | van der Donk | F23N 5/242 237/12 |
| 2014/0343734 A1* | 11/2014 | Meyer | G01F 25/0007 700/282 |
| 2015/0286222 A1* | 10/2015 | Goldstein | G05D 7/0635 700/282 |
| 2016/0041565 A1* | 2/2016 | Edwards | G05D 23/1919 700/282 |

* cited by examiner

*Primary Examiner* — Paul M. West
(74) *Attorney, Agent, or Firm* — FisherBroyles, LLP; Keats Quinalty

(57) ABSTRACT

A natural gas automatic shutoff system can analyze the flow rate of natural gas through a pipe. When an anomaly is detected, the device can prevent further flow of natural gas through the pipe and can automatically notify the homeowner or authorized monitor, such as through a cell phone application or other device. Additionally, the homeowner or authorized monitor can manually control and/or monitor the flow of gas through the pipe in real-time, such as through a cell phone application or other device. At least one exemplary embodiment uses a motorized ball valve to control the flow of gas, a flow meter to measure the rate of natural gas flow through the pipe, and a microcomputer to analyze the flow and send notifications to the homeowner or authorized monitor.

13 Claims, 5 Drawing Sheets

GAS SHUTOFF SYSTEM

CROSS-REFERENCE TO RELATED APPLICATIONS

The present application claims the benefit of priority to U.S. Provisional Application No. 62/705,336, filed Jun. 22, 2020, the contents of which are incorporated herein by reference.

BACKGROUND

In one aspect, the present disclosure details a device installed on a main gas line of a dwelling, such as a house or apartment. The device monitors and analyzes gas flow rate. When an abnormality is detected, such as a high or abnormal rate of gas flow, or an irregular, abnormal, or extended period of time of continuous gas flow, the device: (1) triggers an alarm, (2) automatically shuts off the gas supply to the home, (3) automatically notifies the homeowner or authorized user, such as through a cell phone application (app), and allows the user the option of shutting off the gas supply, or (4) combinations of these options. By shutting off the flow of gas, the device helps prevent property damage, injuries, and fatalities that can result from a gas leak which can contribute to fires/explosions in residential buildings. The user can also monitor the flow of natural gas through the pipe via a cell phone or other device.

Some unique exemplary benefits of the device include:
  Although the present device could be utilized in an industrial setting, the device is intended for residential use, where other systems are for industrial settings only.
  In at least one embodiment, the device automatically shuts off the flow of gas when a leak is detected, where other systems only provide a notification that a leak is detected.
  The device provides real-time monitoring capability that enables a user to monitor natural gas usage through a smartphone app. In at least one embodiment, instead of automatically shutting off the flow of gas, the app provides a user the ability to shut off the flow of gas through the click of a button. If the user detects signs of a natural gas leak, such as an abnormal smell, prior to detection of the gas leak by the device detailed herewithin, the user can utilize the application and shut off the gas flow. This capability of shutting off gas flow is essentially a fail-safe provided by the device to a user, so that, even if the system fails, is delayed in detection/notification of a gas leak, or does not detect a leak, the user can override and shut off the flow of gas.

BRIEF DESCRIPTION OF THE DRAWINGS

The accompanying drawings, which are incorporated herein and constitute part of this specification, illustrate the presently preferred embodiments of the disclosure, and, together with the general description given above and the detailed description given below, serve to explain the features of the disclosure. In the drawings:

FIG. 3 shows an exemplary standby or home screen with an indication of gas flow status, an emergency shutoff button, a setup button, a mode selection button operable to switch between "stay mode" and "away mode", and a help button.

FIG. 4 shows the exemplary Setup screen shown which requests information to be input by a user, namely the number of: people in the home, water heaters, stove (burners), fireplace(s), air conditioning units, heater/furnace(s), and options to add appliances. The user input criteria are exemplary only and can include more or less options.

FIG. 5 shows a screen that indicates that a potential leak has occurred and asks a user whether a gas smell exists and whether a gas appliance is in use.

FIG. 6 shows a screen that indicates that the gas flow to a user's house has been shut off by the safety system, that warns the user that a catastrophic leak has occurred, that a life-threatening situation has occurred, that the house should be evacuated, and that the user should call 911 (although not shown in this example, the application can automatically contact 911 or other emergency notification or service

DETAILED DESCRIPTION

Figure 1:
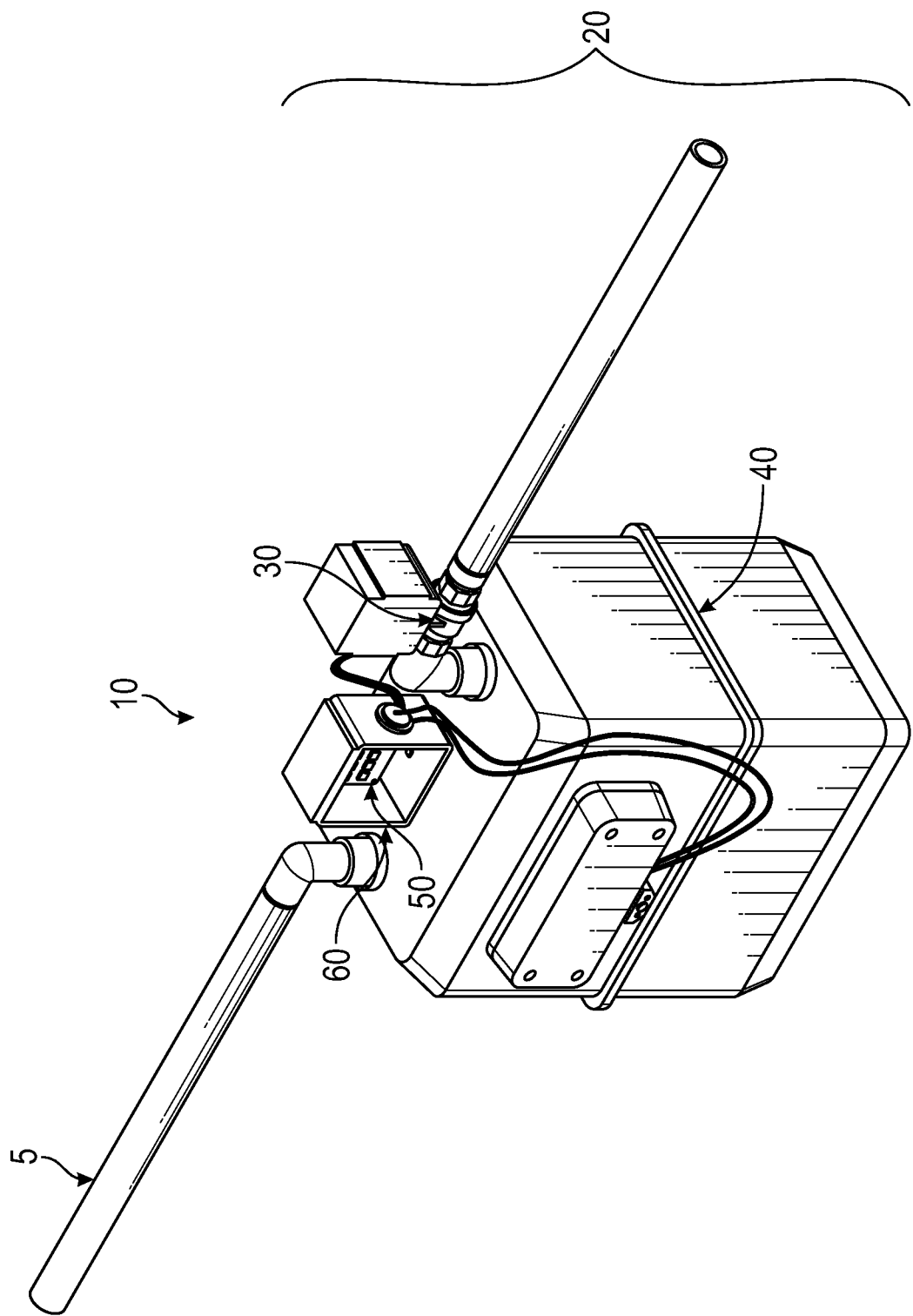
FIG. 1 shows an exemplary embodiment of a gas shutoff device in a residential gas system.

In the drawings, like numerals indicate like elements throughout. Certain terminology is used herein for convenience only and is not to be taken as limiting. The terminology includes the words specifically mentioned, derivatives thereof and words of similar import. The embodiments illustrated below are not intended to be exhaustive or to limit to the precise form disclosed. These embodiments are chosen and described to best explain the principles, application, and practical use, and to enable others skilled in the art to best utilize the present disclosure.

FIG. 1 shows an exemplary embodiment of a gas shutoff device in a residential gas system. As shown in FIG. 1, gas line 5 is disposed outside a wall 10 of a residential home, with a gas shutoff device 20 installed on the gas line 5. The exemplary configuration shown in FIG. 1 is not intended to be limiting as device 20 can be placed in other locations, including, for example, configurations with the device 20 inside the residential home. As shown in FIG. 1, the device 20 includes at least four components, including a valve 30, flow meter 40, microcomputer 50, and intrinsically safe enclosure 60.

In at least one exemplary embodiment, the valve 30 may be an electric valve, such as the 0.75 inch, 12V Motorized Ball Valve sold by Electric Solenoid Valves (www.electic-solenoidvalves.com) under part BVB5CV-XR22. However, the exact diameter of the valve 30 may vary depending on the diameter of the natural gas pipeline 5 on which the valve is installed. While other valves that are suitable for natural gas use can also be utilized, the referenced valve includes additional safety features, including a Viton seal to prevent leakage. One particular advantage of this particular exemplary ball valve is that it only draws power upon opening or closing, and not constantly as is often typical for solenoid valves. The valve 30 may be operated by an external motor (not shown), or by an integrated motor, such as the integrated motor that is installed within the exemplary valve.

The flow meter 40 can be a pulse output gas meter, such as the 0.75 inch, 5V Pulse Output Gas Meter sold by EKM Metering Inc. (www.ekmmetering.com) under part PGM-075. However, the exact diameter of the flow meter 40 may vary depending on the diameter of the gas line 5 on which it is installed. While other methods of measuring flow can be used, such as, for example, differential pressure, ultrasound, or mass flow metering systems, the exemplary referenced meter is generally less costly and requires less maintenance/calibration than other natural gas metering systems.

The microcomputer 50 can read the output of the flow meter 40 and execute a shutoff program to close the valve 30 if an abnormality is detected by the flow meter 40. In one exemplary embodiment, the microcomputer can be a RPi 3 Model B (https://amzn.to/3bT78KE) or the Arduino Uno Rev3 (https://amzn.to/2OZuqpi). Additionally, the microcomputer 50 can communicate wirelessly with the homeowner or authorized monitor's smartphone, computer, or other interface, to alert of potential leaks via an application, text message, or other method.

The microcomputer 50 and other components can be housed within an intrinsically safe enclosure 60, to prevent a spark generated by the microcomputer 50 or other component of device 20 from igniting an explosion, should natural gas be present in the environment. Additionally, this enclosure 60 can prevent precipitation and other debris from damaging components of the device 20.

Figure 2:
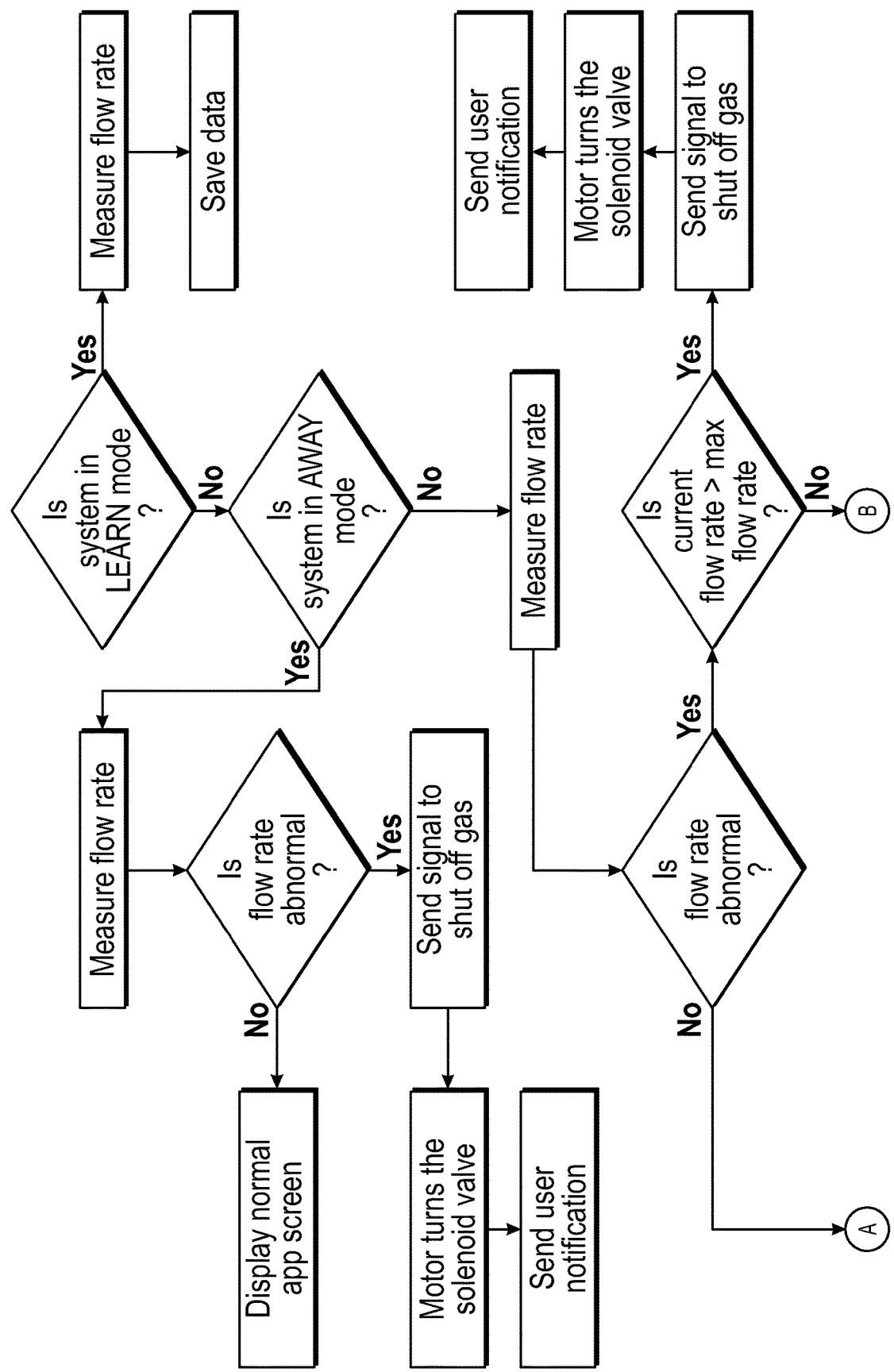
FIG. 2 shows a flowchart of operation of the device of FIG. 1.
Figure 2:
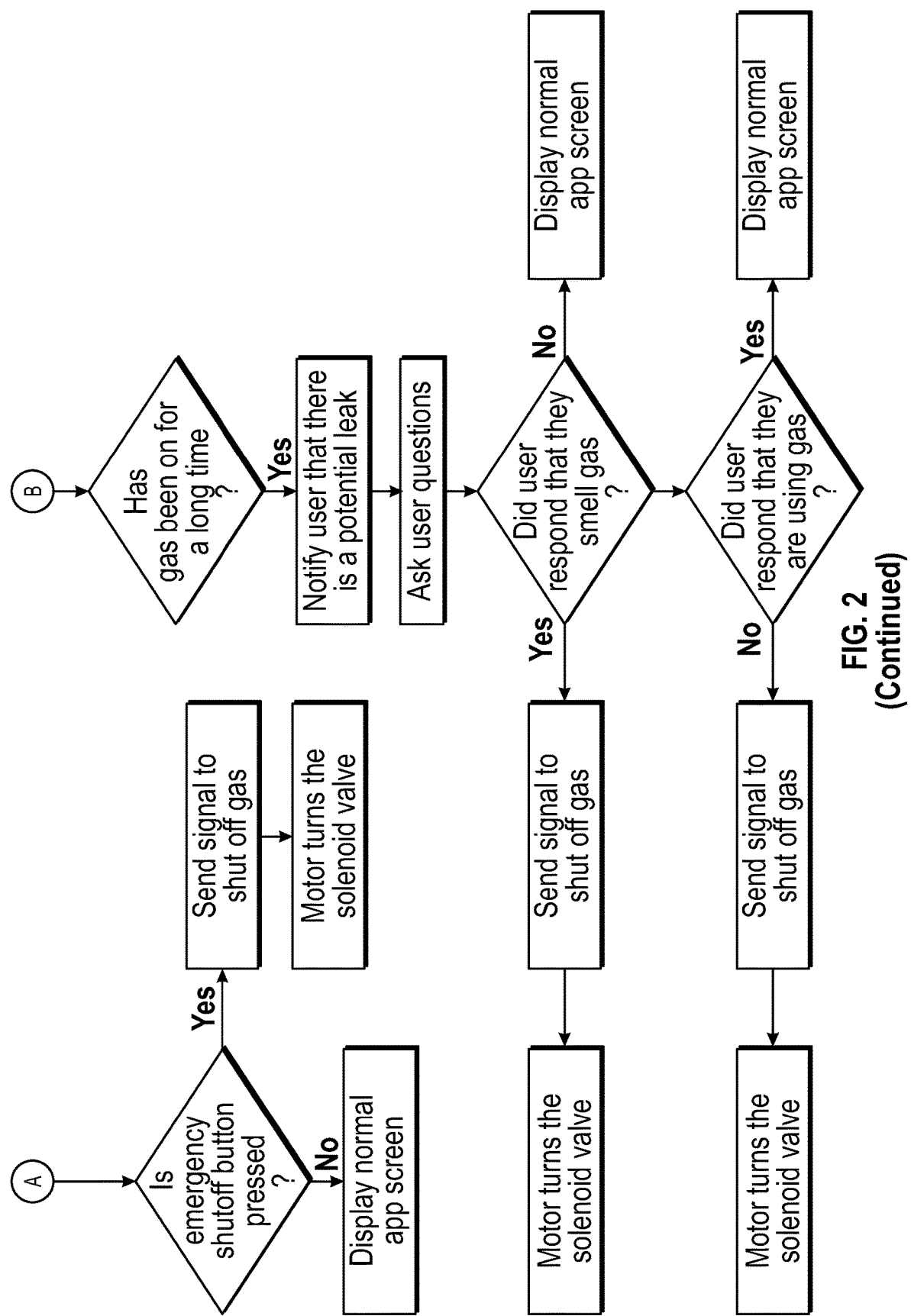
Figure 4:
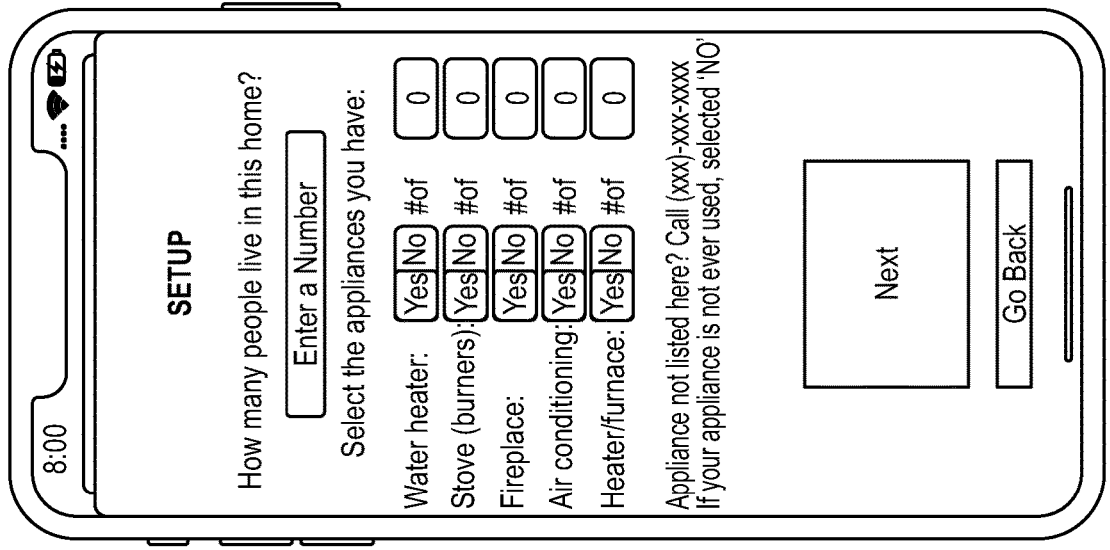
FIGS. 3-6 show an exemplary application on a smartphone.

FIG. 2 shows a flowchart of operation of the device of FIG. 1. Once installed, the device 20 of FIG. 1 is generally connected by a homeowner or authorized user to the internet, either wirelessly or via an ethernet cable, and the homeowner or authorized user installs an application, such as on a smartphone, laptop, or other interface. When the application is first opened, the homeowner/user can enter information about their gas usage to set up a device (shown in FIG. 4). In at least one exemplary embodiment, the user can set the application to learn mode to enable the device to "learn" the user's typical gas usage. After about a week, learn mode should generally be switched off.

Once the application is installed and learn mode is set up, the device 20 is considered ready for use. The device 20 first attempts to detect whether any leaks exist. If no leaks are detected, the application will display a default or home screen as shown in one exemplary embodiment in FIG. 3. Here, the valve 30 is open and remains open until closed. If a minor abnormality is detected in the gas flow, e.g. a long time period of constant gas flow, the application alerts the user and provides two questions for them to answer to determine if there is a leak. If the user believes there is a leak, then the user can select an "Emergency Shutoff" button and the valve will close. When an emergency shutoff is initiated, the application transmits a signal to the microcomputer 50, e.g. via wireless internet, Bluetooth, or other signal, to execute a shutoff program. The shutoff program enables the microcomputer to supply power (e.g. 12V of power) to the valve 30 to close the valve 30. When the valve is closed, further leakage and damage are prevented.

In another aspect, if a sudden, rapid increase in gas flow rate is detected, the device 20 will automatically turn the valve 30 off. The user will then be notified via the app (one exemplary option is shown in FIG. 6), and, optionally, a text or other electronic notification message will be sent to the homeowner or authorized user to alert that the valve 30 was turned off.

Further, if the user smells gas or otherwise believe that a problem with the gas is occurring, even if the device 20 has not triggered or otherwise indicated an issue with the gas flow, the user has the option to turn the valve 30 off remotely. In one exemplary embodiment, the remote turn off option is shown as a red emergency shutoff button in FIG. 3.

Figure 3:
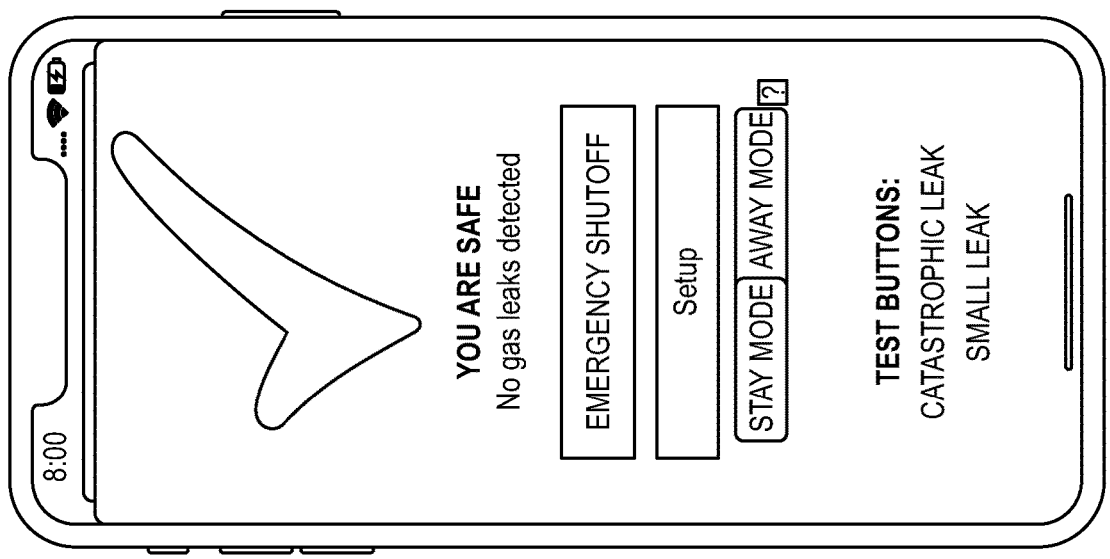
Figure 6:
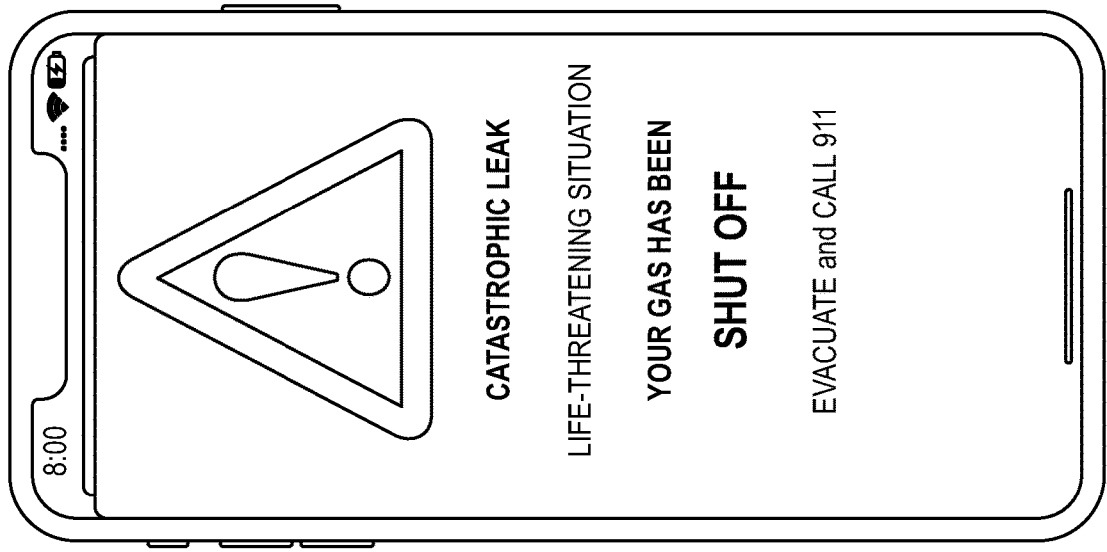
Figure 5:
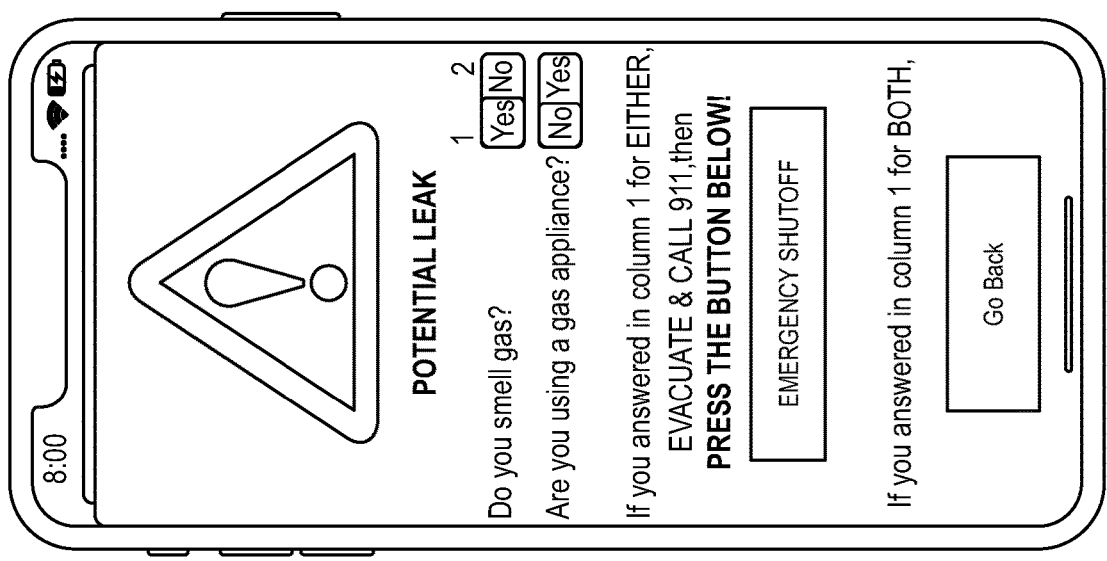

FIGS. 3-6 show an exemplary application on a smartphone. FIG. 3 shows an exemplary standby or home screen with an indication of gas flow status, an emergency shutoff button, a setup button, a mode selection button operable to switch between "stay mode" and "away mode", and a help button. The buttons shown in FIG. 3 are exemplary only and can include more or less options. If the "Setup" button is selected in FIG. 3, the application proceeds to the exemplary screen shown in FIG. 4. The exemplary Setup screen shown in FIG. 4 requests information to be input by a user, namely the number of: people in the home, water heaters, stove (burners), fireplace(s), air conditioning units, heater/furnace(s), and options to add appliances. The user input criteria are exemplary only and can include more or less options. FIG. 5 shows a screen that indicates that a potential leak has occurred and asks a user whether a gas smell exists and whether a gas appliance is in use. FIG. 5 provides an option for a user to immediately shut off the gas flow to the house or to return to the previous screen if a smell of gas is not detected or if the user is utilizing a gas appliance. FIG. 6 shows a screen that indicates that the gas flow to a user's house has been shut off by the safety system, that warns the user that a catastrophic leak has occurred, that a life-threatening situation has occurred, that the house should be evacuated, and that the user should call 911 (although not shown in this example, the application can automatically contact 911 or other emergency notification or service.

In at least one embodiment, a gas shutoff system is provided that includes a flow meter, a valve, and a processor. The flow meter is operable to analyze a flow rate of gas through the system. When an anomaly is detected in the flow rate of gas, the system operates the valve to stop the flow rate of gas. Additionally, the system automatically sends a notification of the anomaly. The valve can be a ball valve or other electric valve. The flow meter either can be in the interior of a residence of a user or can be in the exterior of a residence of a user. In at least one embodiment, the processor is in an intrinsically safe enclosure. The notification can be a text message or can be sent to an application on a cell phone or other electronic device. Alternatively, the notification can be an alarm that includes a light, an audible noise, or both a light and an audible noise.

In another embodiment, a gas shutoff system is provided that includes a flow meter, a valve, and a processor. The flow meter is operable to analyze a flow rate of gas through the system. When an anomaly is detected in the flow rate of gas, the system automatically sends a notification of the anomaly to a user. The user can then operate the valve to stop the flow rate of gas. The valve can be a ball valve or electric valve. The flow meter either can be in the interior of a residence of a user or can be in the exterior of a residence of a user. In at least one embodiment, the processor is in an intrinsically safe enclosure. The notification can be a text message or can be sent to an application on a cell phone or other electronic device. Alternatively, the notification can be an alarm that includes a light, an audible noise, or both a light and an audible noise.

An exemplary method of using a gas shutoff system can include: providing a flow meter, a valve, and a processor, and analyzing a flow rate of gas through the system with the flow meter. When an anomaly is detected in the flow rate of gas, the system either: (1) operates the valve to stop the flow rate of gas and automatically sends a notification of the anomaly, or (2) sends a notification of the anomaly to a user. The user can then remotely operate the valve to stop the flow rate of gas. The valve can be a ball valve or electric valve. The flow meter either can be in the interior of a residence of a user or can be in the exterior of a residence of a user. In at least one embodiment, the processor is in an intrinsically safe enclosure. The notification can be a text message or can be sent to an application on a cell phone or other electronic device. Alternatively, the notification can be an alarm that includes a light, an audible noise, or both a light and an audible noise.

It will be appreciated by those skilled in the art that changes could be made to the embodiments described above without departing from the broad inventive concept thereof. For example, the valve, motor, microcomputer, or flow meter could include additional features. It is understood, therefore, that this disclosure is not limited to the particular embodiments disclosed, but it is intended to cover modifications within the spirit and scope of the present disclosure as defined by the appended claims.

The present disclosure can be understood more readily by reference to the instant detailed description, examples, and claims. It is to be understood that this disclosure is not limited to the specific systems, devices, and/or methods disclosed unless otherwise specified, as such can, of course, vary. It is also to be understood that the terminology used herein is for the purpose of describing particular aspects only and is not intended to be limiting.

The instant description is provided as an enabling teaching of the disclosure in its best, currently known aspect. Those skilled in the relevant art will recognize that many changes can be made to the aspects described, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the instant description is provided as illustrative of the principles of the present disclosure and not in limitation thereof.

As used herein, the singular forms "a," "an" and "the" include plural referents unless the context clearly dictates otherwise. Thus, for example, reference to a "body" includes aspects having two or more bodies unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Although several aspects of the disclosure have been disclosed in the foregoing specification, it is understood by those skilled in the art that many modifications and other aspects of the disclosure will come to mind to which the disclosure pertains, having the benefit of the teaching presented in the foregoing description and associated drawings. It is thus understood that the disclosure is not limited to the specific aspects disclosed hereinabove, and that many modifications and other aspects are intended to be included within the scope of the appended claims. Moreover, although specific terms are employed herein, as well as in the claims that follow, they are used only in a generic and descriptive sense, and not for the purposes of limiting the described disclosure.

What is claimed is:

1. A gas shutoff system comprising:
    a flow meter;
    a valve;
    a processor;
    wherein the flow meter is operable to analyze a flow rate of gas through the system;
    wherein the system enables a user to monitor the flow rate of gas with a smartphone or computer application;
    wherein, when
        a minor abnormality is detected in the flow rate of gas, the system alerts the user through the smartphone or computer application and requests input from the user before the valve is closed to stop the flow rate of gas; and
    wherein, when a high flow, abnormal flow, irregular flow, or extended period of time of continuous gas flow is detected
        in the flow rate of gas, the system closes the valve to stop the flow rate of gas and the system automatically sends a notification to the user via the smartphone or computer application.

2. The gas shutoff system of claim 1 wherein the valve is a ball valve or electric valve.

3. The gas shutoff system of claim 1 wherein the flow meter is interior of a residence of the user.

4. The gas shutoff system of claim 1 wherein the flow meter is exterior of a residence of the user.

5. The gas shutoff system of claim 1 wherein the processor is disposed in an intrinsically safe enclosure.

6. The gas shutoff system of claim 1 wherein the notification is a text message or is sent to an application on a cell phone or other electronic device.

7. The gas shutoff system of claim 1 wherein the notification is an alarm that includes a light, an audible noise, or both the light and audible noise.

8. A method of using a gas shutoff system comprising:
    providing a flow meter, a valve, and a processor;
    analyzing a flow rate of gas through the system with the flow meter;
    wherein the system enables a user to monitor the flow rate of gas with a smartphone or computer application;
    wherein, when a minor abnormality is detected
        in the flow rate of gas, the system alerts the user through the smartphone or computer application and requests input from the user before the valve is closed to stop the flow rate of gas; and
    wherein, when a high flow, abnormal flow, irregular flow, or extended period of time of continuous gas flow is detected
        in the flow rate of gas, the system closes the valve to stop the flow rate of gas and sends a notification to the user via the smartphone or computer application.

9. The method of using a gas shutoff system of claim 8 wherein the valve is a ball valve or electric valve.

10. The method of using a gas shutoff system of claim 8 wherein the flow meter is interior of a residence of the user.

11. The method of using a gas shutoff system of claim 8 wherein the processor is disposed in an intrinsically safe enclosure.

12. The method of using a gas shutoff system of claim 8 wherein the notification is a text message or is sent to an application on a cell phone or other electronic device.

13. The method of using a gas shutoff system of claim 8 wherein the notification is an alarm that includes a light, an audible noise, or both the light and audible noise.

\* \* \* \* \*